: US 12,553,105 B2
(45) Date of Patent: Feb. 17, 2026

(12) United States Patent
Liao et al.

(54) FEED METHOD FOR ELECTROSLAG REMELTING FURNACE

(71) Applicant: Longnan Longyi Heavy Rare-Earth Technology Co., Ltd., Ganzhou (CN)

(72) Inventors: Zhijin Liao, Ganzhou (CN); Le Xu, Ganzhou (CN); Chunhong Li, Ganzhou (CN); Qing Yang, Ganzhou (CN); Fusheng Zhu, Ganzhou (CN)

(73) Assignee: Longnan Longyi Heavy Rare-Earth Technology Co., Ltd., Ganzhou (CN)

( * ) Notice: Subject to any disclaimer, the term of this patent is extended or adjusted under 35 U.S.C. 154(b) by 870 days.

(21) Appl. No.: 17/757,489

(22) PCT Filed: Jul. 10, 2020

(86) PCT No.: PCT/CN2020/082426
§ 371 (c)(1),
(2) Date: Jun. 16, 2022

(87) PCT Pub. No.: WO2021/134950
PCT Pub. Date: Jul. 8, 2021

(65) Prior Publication Data
US 2023/0018117 A1 Jan. 19, 2023

(30) Foreign Application Priority Data
Dec. 31, 2019 (CN) .......................... 201911421171.0

(51) Int. Cl.
*C22B 9/18* (2006.01)
(52) U.S. Cl.
CPC ..................................... *C22B 9/18* (2013.01)

(58) Field of Classification Search
CPC ......... C22B 9/18; C21C 7/0006; C22C 38/02; C22C 38/04; C22C 38/22; C22C 38/24
See application file for complete search history.

(56) References Cited

FOREIGN PATENT DOCUMENTS

CN 101003859 A * 7/2007

OTHER PUBLICATIONS

Chang Lizhong et.al. [CN104762488A] (machine translation) (Year: 2015).*

(Continued)

*Primary Examiner* — Sally A Merkling
*Assistant Examiner* — Nazmun Nahar Shams
(74) *Attorney, Agent, or Firm* — Wang Law Firm, Inc.

(57) ABSTRACT

The present invention provides an feed method for electroslag remelting furnace which includes the following steps: mounting a wire in a wire feeder, activating the wire feeder, passing the wire through a straightening machine and an insulating sleeve in sequence, and then stopping the wire feeder; mounting an electrode requiring electroslag on an electroslag furnace and placing the same in a crystallizer; activating a control system to start the electroslag production, the control system processing the acquired weight information, length information, and position information and comparing the same with a preset process parameter to form a comparison result; and the control system sending a control instruction according to the comparison result, and automatically adjusting the wire feeding speed of the wire feeder and the lifting height of the lifter. The wire feeding method according to the present invention has the advantages of simple operation and precise control.

8 Claims, 4 Drawing Sheets

(56) References Cited

OTHER PUBLICATIONS

Jiang Zhouhua Yu [CN101003859A] (machine translation) (Year: 2007).*
Zhang Qingchen [CN1858265A] (machine translation) (Year: 2006).*

* cited by examiner

FEED METHOD FOR ELECTROSLAG REMELTING FURNACE

TECHNICAL FIELD

The present invention relates to a wire feeding method for a metallurgical device, in particular to a feed method for electroslag remelting furnace.

BACKGROUND ART

Now in the of metallurgical production industry, the of the electroslag remelting furnace usually use its inclusion removal and good crystallization merits to remelt electroslag on the metal, so as to improve the purity of the metal, make the as-cast structure fine and uniform, disperse and refine the inclusions, and improve the performance of the metal material. When removing impurities, the slag liquid also removes some active metal elements, resulting in a change in the metal component. Since the electrode to be electroslag remelted has a small space from the crystallizer, and the electrode and the crystallizer are uniformly conductive and have a high voltage, if a metal wire is added to the crystallizer, it is easy to cause a short circuit between the metal wire and the crystallizer to damage the crystallizer. At present, there are mainly two ways to control the components of the metal material. One is to calculate the loss amount of the active metal element in advance and increase the content of the active metal in the electrode when producing the electrode, making this method costly. Another is to break the metal elements to be replenished into small particles, which are added into the crystallizer during the electroslag. This method has problems in that: the active metal element is added to the surface of the slag liquid, and the burning loss is large; it is not easy to control, and it is easy to react with the slag liquid; and the waste is large, thereby affecting the balance of the slag liquid.

In view of the above problems, it is a need to provide an feed method for electroslag remelting furnace.

SUMMARY OF THE INVENTION

It is an object of the present invention to provide an feed method for electroslag remelting furnace that is simple to operate, precise to control, and highly automated.

In order to achieve the above-mentioned object, the present invention provides a feed method for electroslag remelting furnace. The electroslag remelting furnace includes a main body and a wire feeding device. The main body is provided with a post, an electrode, and a crystallizer. The wire feeding device includes a wire feeder provided above the crystallizer; a lifter; an insulating sleeve mounted to the lifter and configured to be insertable into the crystallizer; a length sensor and a position sensor respectively used for acquiring wire feeding length information of the wire, and position information of the insulating sleeve in the crystallizer; a weighing sensor used for acquiring weight information of the electrode; and a control system connected with the weighing sensor, length sensor, position sensor, wire feeder, and the lifter. The control system is used for acquiring and processing the weight information, the length information and the position information, and feeding back a control instruction to the wire feeder and lifter.

The feed method comprises following steps: mounting a wire to the wire feeder, activating the wire feeder, passing the wire through a straightening machine and the insulating sleeve in sequence, and then stopping the wire feeder; mounting the electrode requiring electroslag to the electroslag remelting furnace and placing the electrode into the crystallizer; and activating the control system to start electroslag production. The control system processes the weight information, length information, and position information, and compares the same with a preset process parameter to form a comparison result; the control system sends a control instruction according to the comparison result and automatically adjusts wire feeding speed of the wire feeder and a lifting height of the lifter.

In an embodiment, the wire is a cored wire and/or a metal solid wire; it is preferable that the material for manufacturing the metal solid wire and the outer wrapping material of the cored wire are close to the components of the metal material required to be produced by electroslag, or the core material of the cored wire contains a metal element required to be added so as to facilitate component control.

In an embodiment, the control system, after processing the weight information, obtains a liquid level height of alloy liquid formed in crystallizer by electroslag.

In an embodiment, the control system keeps a distance between the insulating sleeve and a liquid level of the alloy liquid constant according to the liquid level height and position information.

In an embodiment, the insulating sleeve introduces the wire vertically into the alloy liquid; the wire is introduced vertically into the alloy liquid, and the amount of wire added can be controlled more precisely.

In an embodiment, the control system controls the wire feeding speed of the wire feeder by processing the weight information and the length information to compare with the preset process parameters so that the weight ratio of the amount of the fed wire to the alloy liquid formed by electroslag is kept constant.

In an embodiment, the wire feeder comprises a wire feeding frame, a transmission device, and a guide tube. The transmission device is mounted to the wire feeding frame, and the transmission device includes a speed reducer, a wire feeding driving wheel, and a wire feeding driven wheel; the wire feeding driving wheel is mounted to the speed reducer, the wire feeding driven wheel is cooperatively mounted to one side of the wire feeding driving wheel, a transmission channel is defined between the wire feeding driving wheel and the wire feeding driven wheel, and the guide tube is cooperatively mounted to two sides of the transmission channel.

In an embodiment, the speed reducer, the wire feeding driving wheel and the wire feeding driven wheel are provided with at least two sets.

In an embodiment, one side of the wire feeder is provided with a pay-off rack for placing a wire.

In an embodiment, the lifter comprises a servo motor, a sliding guide rail, a lead screw, and a sliding platform. The servo motor is connected to the lead screw, the lead screw is mounted to the sliding guide rail, and the sliding platform is mounted to the sliding guide rail.

In an embodiment, the electroslag furnace comprises a post, a motor, an electrode, an electrode support, and a crystallizer. The crystallizer is provided at one side of the post. The electrode support is connected to the motor. The electrode support is mounted to the post, and the electrode is mounted to the electrode support.

In an embodiment, the straightening machine comprises a mounting plate and several straightening wheels. The mounting plate is provided with several adjusting waist-shaped holes, the straightening wheels are mounted to the mounting plate through the adjusting waist-shaped holes, and a straightening channel is defined between the straightening wheels.

The invention has beneficial effects as follows: the wire feeding method provided by the present invention acquires the weight information of the electrode that underwent electroslag operation and the feeding length information of the wire in real time by a control system, and performs a comparison treatment with a preset process parameter, so as to control the wire feeding speed of the wire feeder so that the weight ratio of the amount of the fed wire to the alloy liquid formed by the electrode electroslag remains constant; the method has the advantages of simple operation, high degree of automation, and precise control.

DETAILED DESCRIPTION OF THE INVENTION

The technical solutions of the present invention will be clearly and completely described below with reference to specific embodiments and accompanying drawings. It should be noted that when an element is referred to as being "mounted to" another element, it can be directly on the other element or an intervening element may also be present. When an element is referred to as being "connected" to another element, it can be directly connected to another element or an intervening element may also be present at the same time. In the illustrated embodiments, directional representations, i.e., up, down, left, right, front, rear, etc. are relative for purposes of explaining that the structures and movements of the various components of the present application are relative. These representations are appropriate when the components are in the positions shown in the figures. However, if the description of the position of the elements changes, it is assumed that these representations will also change accordingly. In describing the operational method, unless otherwise indicated, the order of the steps of operation may be varied and those skilled in the art can change the above sequence without departing from the scope of the present invention.

Unless defined otherwise, all technical and scientific terms used herein have the same meaning as commonly understood by one of ordinary skill in the art to which this invention belongs. The terminology used herein in the description of the invention herein is for the purpose of describing particular embodiments only and is not intended to be limiting of the present invention. As used herein, the term "and/or" includes any and all combinations of one or more of the associated listed items.

Figure 1:
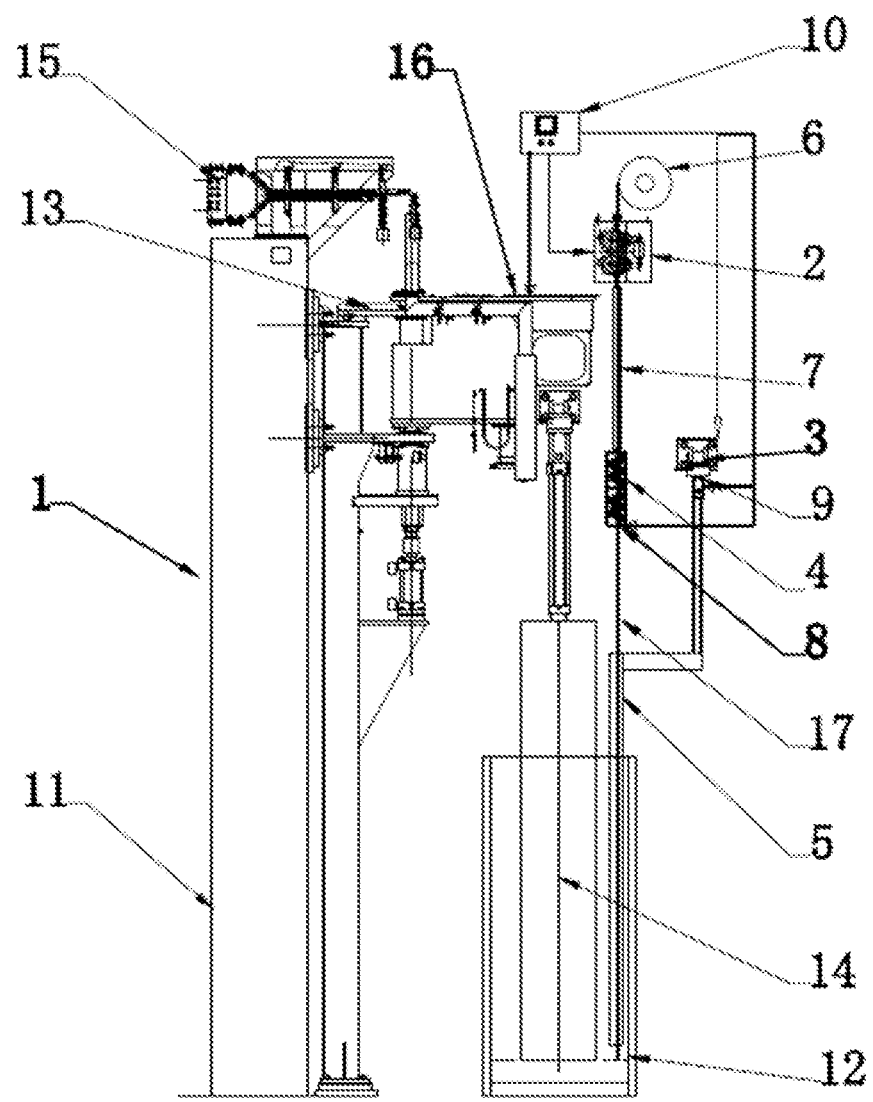
FIG. 1 is a schematic view of an electroslag furnace according to an embodiment of the present invention.

As shown in FIG. 1, the electroslag furnace comprises a main body 1 and a wire feeding device. The wire feeding device comprises a wire feeder 2, a lifter 3, a straightening machine 4, an insulating sleeve 5 (the insulating sleeve 5 is made of a material that is not damaged during the electroslag process, or is slightly damaged but does not adversely affect the product quality), a pay-off rack 6, a wire outlet conduit 7, a length sensor 8, a position sensor 9, a weighing sensor 16, and a control system 10. The main body 1 comprises a post 11, a crystallizer 12, an electrode support 13, an electrode 14, and a motor 15. The electrode support 13 is mounted to the upright post 11, the weighing sensor 16 and the electrode 14 are mounted to the electrode support 13. The motor 15 is connected to the electrode support 13, and the weighing sensor 16 is used for acquiring weight information about the electrode 14. A clamping device is provided on the electrode support 13, the clamping device is used for fixing the electrode 14, and the clamping device can move up and down under the action of the motor 15. The crystallizer 12 is mounted to one side of the post 11 and directly below the electrode 14, and the electrode 14 can extend into the crystallizer 12 under the action of the motor 15.

Figure 2:
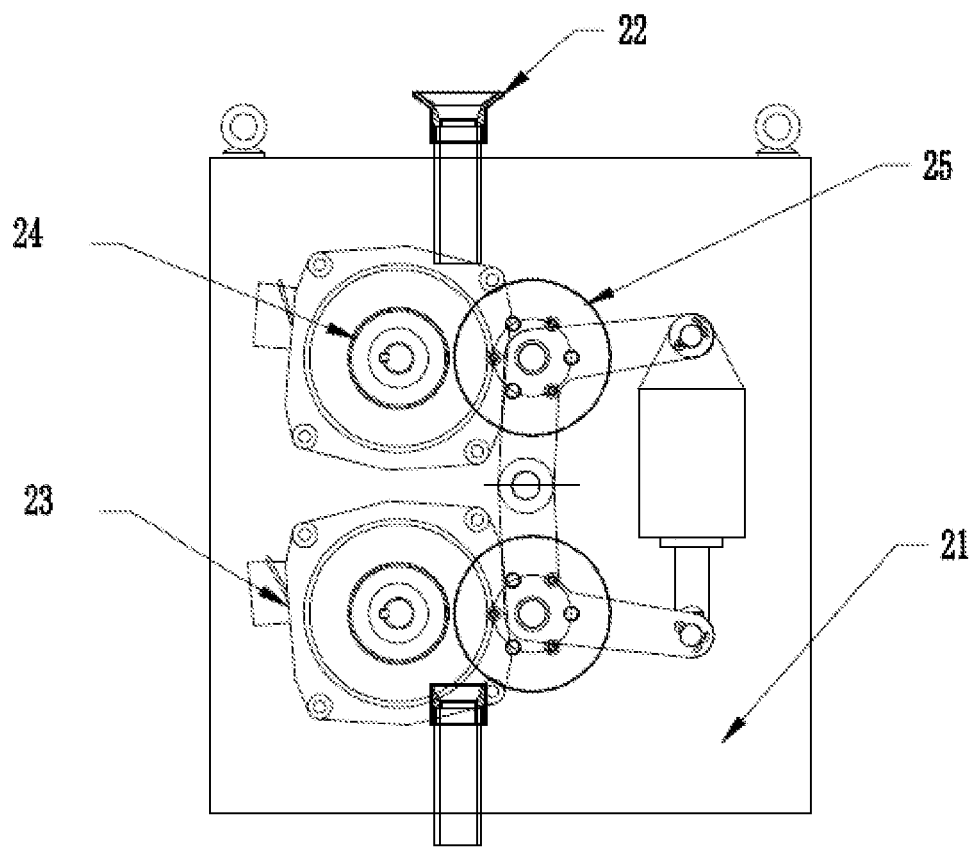
FIG. 2 is schematic view of a wire feeder of the electroslag furnace according to an embodiment of the present invention.

As shown in FIG. 2, the wire feeder 2 comprises a wire feeding frame 21, a transmission device, and a guide tube 22. The transmission device is mounted to the wire feeding frame 21, and the transmission device comprises a speed reducer 23, a wire feeding driving wheel 24, and a wire feeding driven wheel 25. The wire feeding driving wheel 24 is mounted to the speed reducer 23. The wire feeding driven wheel 25 is cooperatively mounted to one side of the wire feeding driving wheel 24. A transmission channel is defined between the wire feeding driving wheel 24 and the wire feeding driven wheel 25, and the guide tube 22 is cooperatively mounted to two sides of the transmission channel. The wire 17 passes through a guide tube 22 located on one side and enters the transmission passage, and the wire 17 can approach or move away from the guide tube 22 located on the other side under the action of the wire feeding driven wheel 25 and the wire feeding driving wheel 24, thereby functioning as a transmission wire 17.

Figure 3:
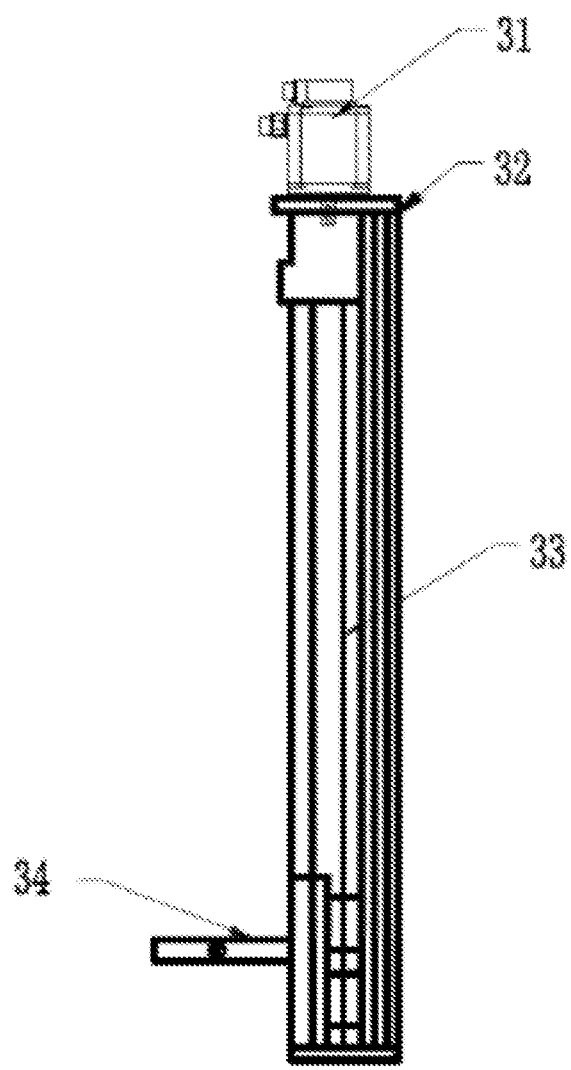
FIG. 3 is a schematic view of a lifter of the electroslag furnace according to an embodiment of the present invention.

As shown in FIGS. 1 and 3, the lifter 3 comprises a servo motor 31, a sliding guide rail 32, a lead screw 33, and a sliding platform 34. The servo motor 31 is connected to the lead screw 33, the lead screw 33 is mounted to the sliding guide rail 32, and the sliding platform 34 is mounted to the sliding guide rail 32. The sliding platform 34 moves up and down along the sliding guide rail 32 under the action of the servo motor 31 and the lead screw 33; an insulating sleeve 5 and a position sensor 9 are mounted to the lifter 3, the position sensor 9 for acquiring the position information of the insulating sleeve 5.

Figure 4:
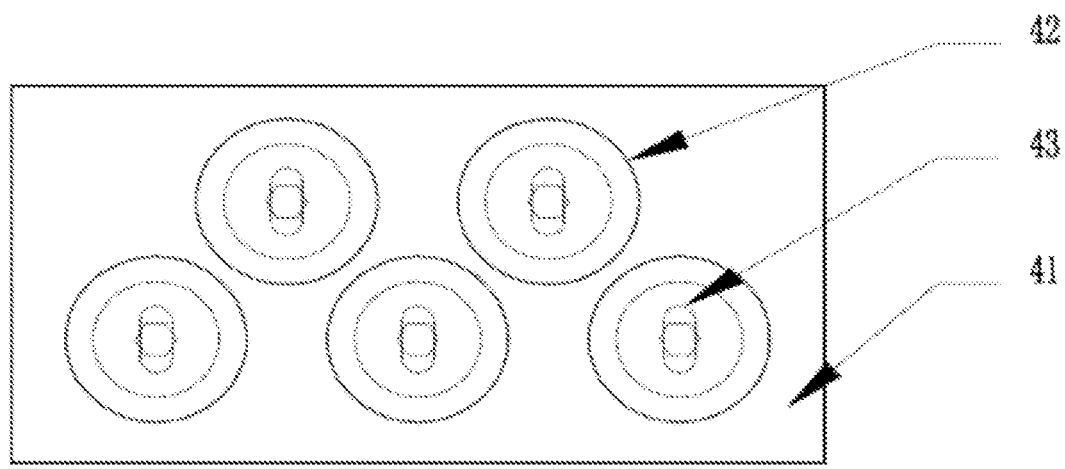
FIG. 4 is a schematic view of a straightening machine of the electroslag furnace according to an embodiment of the present invention.

As shown in FIGS. 1 and 4, the straightening machine 4 comprises a mounting plate 41 and several straightening wheels 42. The mounting plate 41 is provided with several adjusting waist-shaped holes 43, the straightening wheels 42 are mounted to the mounting plate 41 via the adjusting waist-shaped holes 43 and are arranged in a staggered manner, a straightening channel is formed between the straightening wheels 42, and different straightening effects can be achieved by adjusting the relative positions of the straightening wheels 42; a length sensor 8 is further provided at the wire outlet of the straightening machine 4, and the length sensor 8 can acquire the wire outlet length information of the wire passing through the wire outlet of the straightening machine 4.

As shown in FIGS. 1-4, the wire feeder 2 is arranged above the crystallizer 12, the pay-off rack 6 is arranged above the wire feeder 2 (may also be arranged at the side of the wire feeder 12), and a straightening machine 4 is further arranged between the wire feeder 2 and the crystallizer 12.

A wire outlet conduit 7 is provided between the thread feeder 2 and the straightening machine 4, one end of the wire outlet conduit 7 is arranged adjacent to the wire outlet of the guide tube 22 of the thread feeder 2, and the other end of the wire outlet conduit 7 is arranged adjacent to the wire inlet of the straightening machine 4.

The lifter 3 is provided on the upper side of the crystallizer 12, one end of the insulating sleeve 5 is mounted to a sliding platform 34 of the lifter 3, the insulating sleeve 5 is configured to be vertically inserted into the crystallizer 12 and is located between the electrode 14 and the inner wall of the crystallizer 12 after the insertion, and the insulating sleeve 5 can move up and down in the vertical direction inside the crystallizer 12 under the action of the lifter 3.

The length sensor 8 is mounted at the wire outlet of the straightening machine 4, and is used for acquiring the wire feeding length information about the wire 17; the position sensor 9 is mounted to the lifter 3 for acquiring the position information of the insulating sleeve 5 in the crystallizer 12.

The collection wires of the weighing sensor 16, the length sensor 8 and the position sensor 9 are all connected to the control system 10 so that the control system 10 can acquire the weight information, length information and position information collected by the weighing sensor 16, the length sensor 8 and the position sensor 9. The control wires of both the wire feeder 2 and the lifter 3 are connected to the control system 10 so that the control system 10 can feed control instructions to both the wire feeder 2 and the lifter 3.

The collection wires of the weighing sensor 16, the length sensor 8 and the position sensor 9 are all connected to the control system 10 so that the control system 10 can acquire the weight information, length information and position information collected by the weighing sensor 16, the length sensor 8 and the position sensor 9. the control wires of both the wire feeder 2 and the lifter 3 are connected to the control system 10 so that the control system 10 can feed control instructions to both the wire feeder 2 and the lifter 3.

The wire feeding method of the electroslag furnace is as follows:

the wire 17 is mounted to the pay-off rack 6, and then the wire 17 passes through the wire feeder 2, the wire outlet conduit 7, and the straightening channel of the straightening machine 4 in sequence, vertically extends into the insulating sleeve 5, and is introduced into the crystallizer 2 via the insulating sleeve 5; the wire 17 may be a cored wire or a metal solid wire. The motor 15 is activated to extend the electrode 14 into the crystallizer 12. The control system 10 is activated to control the lifter 3 to insert the insulating sleeve 5 into the crystallizer 12, and the wire feeder 2 feeds the wire 17 into the straightening channel of the straightening machine 4 and sends the same to the lower end of the insulating sleeve 5 after straightening; the electroslag furnace 1 is activated to start electroslag production, the weighing sensor 16 starts to acquire the weight information about the electrode 14, and the acquired weight information is fed back to the control system 10 in real time; the control system 10 obtains the melting speed and weight change data of the electrode 14 by analyzing and processing the weight information, and calculates the position of the formed alloy liquid level in the crystallizer 12. Meanwhile, the length sensor 8 and the position sensor 9 feedback the acquired length information and position information to the control system 10 in real time, and after the analysis and processing by the control system 10, obtain the data of the wire feeding length and the wire feeding speed of the wire 17 and the position of the lower end of the insulating sleeve 5 in the crystallizer 12; then according to the data of the alloy liquid level and the position of the lower end of the insulating sleeve 5 in the crystallizer 12, the lifter 3 is automatically adjusted to keep the distance between the insulating sleeve 5 and the alloy liquid level constant; according to the melting speed and weight change data of the electrode 14, and the wire feeding length and wire feeding speed data of the wire 17, the wire feeding speed of the wire feeder 2 is automatically controlled so that the wire 17 is uniformly fed into the alloy liquid.

After the electroslag is finished, the wire feeder 2 is stopped, the insulating sleeve 5 is withdrawn, and at the same time the wire is withdrawn so that the wire 17 and the insulating sleeve 5 are allowed to leave the crystallizer 12, and the wire feeding procedure is finished.

Embodiment 1

The feed method for electroslag remelting furnace of the present invention is used on a 3-ton electroslag furnace, wherein Q235 steel is an electrode, the electroslag melting speed is 6.5±0.3 Kg/min, the addition amount of a rare earth metal is 0.10-0.12%, the diameter of a crystallizer is 400 mm, the wire 17 is a cored wire, the outer layer of the cored wire is a Q235 steel strip, and the content of the rare earth metal is 80 g/m. The specific steps are as follows:

mounting a wire 17 to a pay-off rack 6;

mounting the wire 17 in a wire feeder 2, activating the wire feeder 2, making the wire pass through the wire feeder 2, a wire outlet conduit 7, a straightening machine 4, and an insulating sleeve 5 in sequence, and stopping the wire feeder;

mounting an electrode 14 requiring electroslag to the electroslag furnace and placing the same into the crystallizer 12;

and activating the control system 10 to start the electroslag production, wherein the control system 10 processes the acquired weight information, length information, and position information, and compares the same with preset process parameters to form a comparison result; the control system 10 sends a control instruction according to the comparison result and automatically adjusts the wire feeding speed of the wire feeder 2 and the lifting height of the lifter 3;

after the electroslag is finished, the wire feeder 2 is stopped, the insulating sleeve 5 is withdrawn, and at the same time the wire is withdrawn so that the wire 17 and the insulating sleeve 5 are allowed to leave the crystallizer 12, and the wire feeding procedure is finished.

Embodiment 2

The feed method for electroslag remelting furnace of the present invention is applied to an electroslag furnace having 5 tons. H13 steel (wherein C content is 0.32-0.45%, Si content is 0.80-1.20%, Mn content is 0.20-0.50%, Cr content is 4.75-5.50%, Mo content is 1.10-1.75%, V content is 0.80-1.20%) is used as an electrode, the electroslag melting speed is 8.2±0.4 Kg/min, the addition amount of rare earth metal is 0.15-0.17%, and the diameter of a crystallizer is 500 mm; the outer layer of the cored wire is a steel strip (wherein the content of C is 0.32-0.45%, the content of Si is 0.80-1.20%, and the content of Mn is 0.20-0.50%), the component of the core wire therein is a rare earth metal and the content thereof is 80 g/m. The specific steps are:

mounting a wire 17 to a pay-off rack 6;
mounting the wire 17 in a wire feeder 2, activating the wire feeder 2, making the wire pass through the wire feeder 2, a wire outlet conduit 7, a straightening machine 4, and an insulating sleeve 5 in sequence, and stopping the wire feeder;
mounting an electroslag electrode 14 to the electroslag furnace and placing the same into the crystallizer 12;
and activating the control system 10 to start the electroslag production, wherein the control system 10 processes the acquired weight information, length information, and position information, and compares the same with preset process parameters to form a comparison result; the control system 10 automatically adjusts the wire feeding speed of the wire feeder 2 and the lifting height of the lifter 3 according to the control instruction sent by the comparison result;
after the electroslag is finished, the wire feeder 2 is stopped, the insulating sleeve 5 is withdrawn, and at the same time the wire is withdrawn so that the wire 17 and the insulating sleeve 5 are allowed to leave the crystallizer 12, and the wire feeding procedure is finished.

The steel ingots produced by taking electroslag according to the present invention and the original technology are respectively sampled from the head, the middle, and the tail to analyze and compare the content of the rare earth. The results are as follows:

| The grade of the steel | | Rare earth content of the head (%) | Rare earth content in the middle (%) | Rare earth content of the tail (%) | Qualified rate (%) |
| --- | --- | --- | --- | --- | --- |
| Q235 | Embodiment 1 | 0.117 | 0.109 | 0.112 | 100 |
|  | Original technology | 0.095 | 0.057 | 0.077 | 0 |
| H13 | Embodiment 2 | 0.161 | 0.159 | 0.157 | 100 |
|  | Original technology | 0.127 | 0.083 | 0.104 | 0 |

It can be seen from the above table that the wire feeding method provided by the present invention acquires the weight information of the electrode that underwent electroslag operation and the feeding length information of the wire in real time by a control system, and performs a comparison treatment with a preset process parameter, so as to control the wire feeding speed of the wire feeder so that the weight ratio of the amount of the fed wire to the alloy liquid formed by the electrode electroslag remains constant; the qualified rate of the product can be significantly improved by the method provided by the present invention; at the same time, it has the advantages of simple operation, high degree of automation, and precise control.

It should be understood that while the description has been described in terms of the implementation mode, not every implementation mode only includes one single implementation scheme, and that such recitation of the description is for purposes of clarity only. Those skilled in the art should take the description as a whole, and the technical solutions in each implementation mode can also be appropriately combined to form other implementation modes that can be understood by those skilled in the art.

The foregoing detailed descriptions are only specific descriptions for the feasible implementation mode of the present invention, and they are not used to limit the scope of the present invention. All equivalent implementation modes or modifications made without departing from the technical spirit of the present invention shall be included within the scope of the present invention.

What is claimed is:
1. A feed method for electroslag remelting furnace, the electroslag furnace comprising:
a main body providing with a post, an electrode, and a crystallizer; and
a wire feeding device, which comprises:
a wire feeder provided above the crystallizer;
a lifter,
an insulating sleeve mounted to the lifter and configured to be insertable into the crystallizer;
a length sensor and a position sensor respectively used for acquiring wire feeding length information of the wire, and position information of the insulating sleeve in the crystallizer;
a weighing sensor used for acquiring weight information of the electrode; and
a control system connected with the weighing sensor, length sensor, position sensor, wire feeder, and the lifter, wherein the control system is used for acquiring and processing the weight information, the length information and the position information, and feeding back a control instruction to the wire feeder and lifter,
the feed method comprises the following steps:
mounting a wire to the wire feeder, activating the wire feeder, passing the wire through a straightening machine and the insulating sleeve in sequence, and then stopping the wire feeder;
mounting the electrode requiring electroslag to the electroslag remelting furnace and placing the electrode into the crystallizer; and
activating the control system to start electroslag production, wherein the control system processes the weight information, length information, and position information, and compares the same with a preset process parameter to form a comparison result; the control system sends a control instruction according to the comparison result and automatically adjusts wire feeding speed of the wire feeder and a lifting height of the lifter;
after processing the weight information, the control system obtains a liquid level height of alloy liquid formed in the crystallizer by electroslag;
a constant distance between the insulating sleeve and a liquid level of the alloy liquid constant is kept by the control system according to the liquid level height and the position information.
2. The feed method for electroslag remelting furnace according to claim 1, wherein the wire is a cored wire and/or a metal solid wire.
3. The feed method for electroslag remelting furnace according to claim 1, wherein the insulating sleeve introduces the wire vertically into the alloy liquid.
4. The feed method for electroslag remelting furnace according to claim 1, wherein the wire feeder comprises a wire feeding frame, a transmission device, and a guide tube, wherein the transmission device is mounted to the wire feeding frame, and the transmission device comprises a speed reducer, a wire feeding driving wheel, and a wire feeding driven wheel; the wire feeding driving wheel is mounted to the speed reducer, the wire feeding driven wheel is mounted to one side of the wire feeding driving wheel, a transmission channel is defined between the wire feeding driving wheel and the wire feeding driven wheel, and the guide tube is mounted to two sides of the transmission channel.

5. The feed method for electroslag remelting furnace according to claim 4, wherein at least two sets of the speed reducer, at least two sets of the wire feeding driving wheel, and at least two sets of the wire feeding driven wheel are provided.

6. The feed method for electroslag remelting furnace according to claim 1, wherein the lifter comprises a servo motor, a sliding guide rail, a lead screw, and a sliding platform; wherein the servo motor is connected to the lead screw, the lead screw is mounted to the sliding guide rail, and the sliding platform is mounted to the sliding guide rail.

7. The feed method for electroslag remelting furnace according to claim 1, wherein the electroslag furnace comprises a post, a motor, an electrode, an electrode support, and a crystallizer, the crystallizer being provided at one side of the post, the electrode support being connected to the motor, the electrode support being mounted to the post, and the electrode being mounted to the electrode support.

8. The feed method for electroslag remelting furnace according to claim 1, wherein the straightening machine comprises a mounting plate and several straightening wheels, wherein the mounting plate is provided with several adjusting waist-shaped holes, the straightening wheels are mounted to the mounting plate through the adjusting waist-shaped holes, and a straightening channel is defined between the straightening wheels.

\* \* \* \* \*